United States Patent Office 3,226,873
Patented Jan. 4, 1966

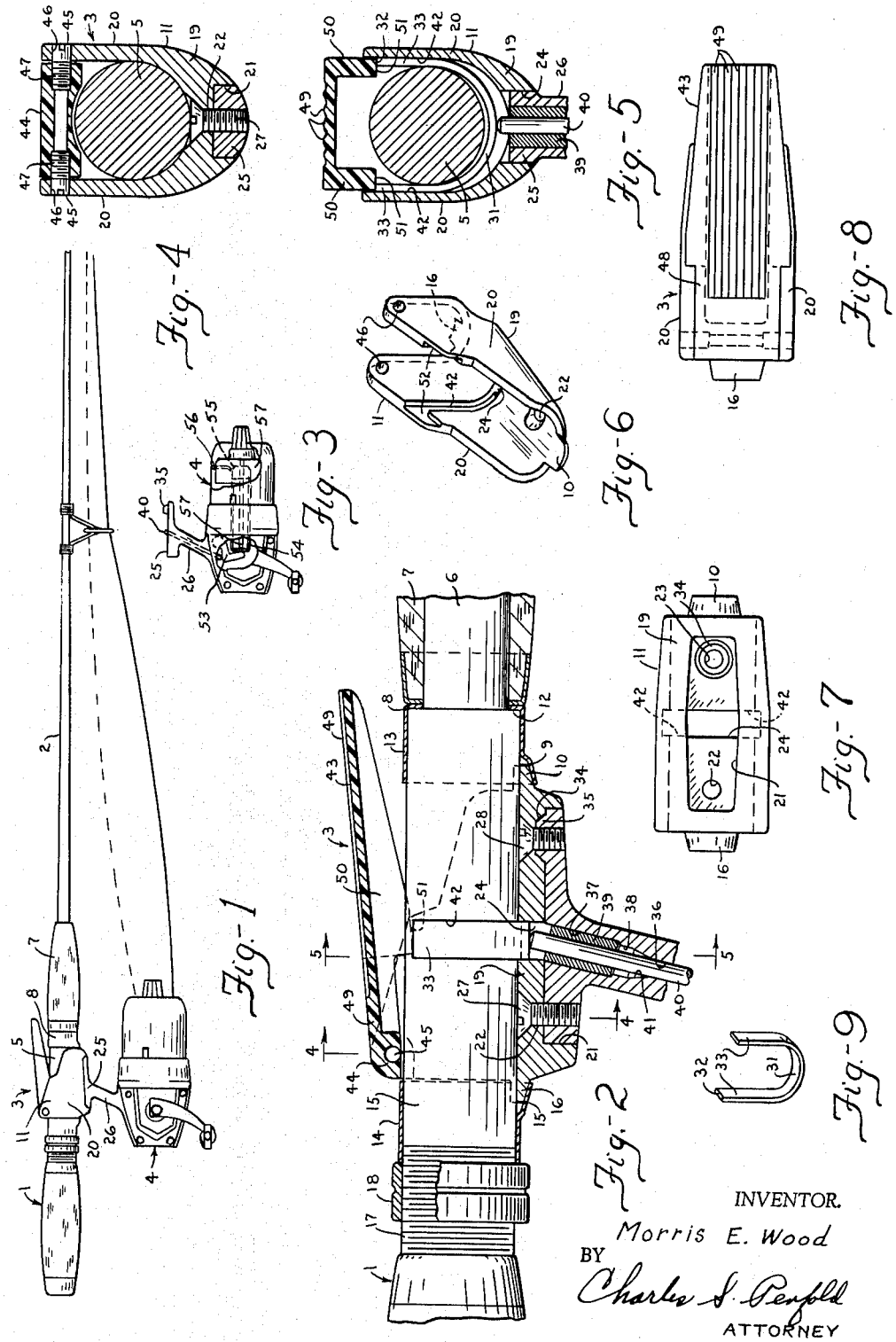

3,226,873
ASSEMBLY FOR ATTACHING A REEL TO A FISHING ROD OR POLE
Morris E. Wood, Bronson, Mich., assignor, by mesne assignments, to Bronson Specialties, Inc., Bronson, Mich., a corporation of Michigan
Filed Aug. 25, 1961, Ser. No. 133,921
9 Claims. (Cl. 43—22)

The subject invention relates generally to fishing tackle and more particularly is directed to means for detachably connecting a reel to a handle structure of a fishing rod or pole.

The invention herein is related to my application, Serial No. 133,907, filed August 25, 1961 and now abandoned, wherein a handle structure of a particular design and construction is described for supporting and operating a part of a novel mechanism of a reel, as distinguished from the subject invention which offers a setup whereby the reel in the related application may be readily detachably connected to a handle structure of conventional construction.

More particularly, an object of the present invention is to provide an assembly embodying improved principles of design and construction which can be applied to a conventional handle structure for operating at least a part of a reel mechanism.

The assembly, above referred to, preferably includes a lower channel or stirrup which is adapted to receive the handle structure and cooperate with a pair of conventional spaced fastening means on the handle structure for holding the channel against longitudinal movement on the handle, a pressure receiving member, and an actuator which is preferably pivotally connected to the channel for actuating the member to move a reciprocally mounted element for operating a part of a reel mechanism, such as a line control assembly thereof.

A significant objective of the invention is to provide an assembly of the character above described in which the channel is provided with an elongate recess or seat for receiving a reel attaching plate and the interior of the channel is provided with transversely disposed means for receiving and guiding the pressure member relative to the actuator and the element to be moved by such member.

Other objects of the invention reside in providing an assembly which offers advantages with respect to efficiency, manufacture and assembly, adaptability and durability.

Additional objects and advantages of the invention will become apparent after the description hereinafter set forth is considered in conjunction with the drawings annexed hereto.

In the drawings:

FIGURE 1 is a side elevational view illustrating the assembly, embodying the invention, as applied to a pole or rod and a reel carried thereby;

FIGURE 2 is an enlarged partial vertical section taken through a part of the handle structure, the assembly and a part of a reel;

FIGURE 3 is a side elevational view of a reel with portions broken away and portions shown in dotted lines to exemplify components of the reel mechanism;

FIGURE 4 is a transverse section taken substantially on line 4—4 of FIGURE 2;

FIGURE 5 is a transverse section taken substantially on line 5—5 of FIGURE 2;

FIGURE 6 is a perspective view of a channel constituting a component of the assembly;

FIGURE 7 is a bottom view of the channel;

FIGURE 8 is a top view of the assembly; and

FIGURE 9 is a pictorial view of a pressure receiving member preferably constituting a component of the assembly.

Referring generally to FIGURES 1 and 2 of the drawing, numeral 1 generally designates a handle structure of a pole or rod 2 and 3 is an assembly which as adapted to be mounted on the handle for operating a part of a mechanism of a reel 4 carried by the assembly.

The handle structure is of a conventional character and may include an intermediate cylindrical portion 5 on which the assembly 3 is mounted, a front cylindrical extremity 6 which carries a grip 7 and a fastening ring 8 provided with a socket portion 9 for receiving a tapered projection 10 on the fore end of a channel 11 constituting a component of the assembly. The ring 8 also includes an end wall 12 which engages the fore end of the intermediate portion and an annular portion 13 which surrounds such portion and is provided with the socket portion 9. The end wall 12 is provided with an aperture through which the front extremity 6 extends.

Another fastening means or ring 14 is slidably mounted on the intermediate portion 5 of the handle and provided with a socket formation 15, corresponding to the formation 9, for receiving a rear tapered projection 16 on the channel which corresponds to the projection 10. The handle is also preferably provided with an external threaded portion 17 which supports an internally threaded pressure member 18 which can be manipulated to cam the projections into the socket formations to firmly anchor the channel in place to receive the intermediate portion as evidenced in FIGURES 1 and 2. The handle may also include a rear extremity which carries a grip as shown.

The channel is preferably constructed in one-piece and includes a relatively thick bottom curved wall 19 and a pair of corresponding upstanding generally triangular shaped parallel walls 20. The bottom wall is provided with an external elongate recess 21, a pair of longitudinally spaced transverse holes 22 and 23 intersecting the recess, and a rectangular transverse opening 24 between said holes. An attaching portion or plate 25 integral with a tubular part 26 of a frame of the reel 4 is adapted for securement in the recess 21 by a pair of screws 27 and 28 which extend through the holes and respectively connect with threaded apertures 29 and 30 provided in the plate. The bottom wall is also provided with countersinks for receiving the heads of the screws.

It is to be noted that the bottom wall of the channel has a tapering thickness as well as the plate of the reel to promote the structural design and construction of the complete structure. Attention is directed to the fact that the post is preferably disposed at an oblique angle with relation to the longitudinal axes of the pole and rod and that the opening 24 in the channel is preferably of a size to accommodate an arcuate bottom wall 31 of a pressure receiving member 32 having parallel upstanding legs 33. Moreover, it should be noted that the bottom wall of the channel is preferably provided with a tapered recess 34 which receives a tapered boss 35 on the plate 25 to promote stability of the connection between the reel and assembly.

The post of the reel is tubular, as stated above, and is so made by providing a bore 36 and counter-bores 37 and 38 with a bearing 39 press-fitted in the counter-bore 37. The bore 36 and bearing 39 slidably receive a reciprocably mounted element 40 and the counter-bore 38 and an adjacent tapered bore 41 provide relief to reduce friction between the element and post. The bore 41 also assists in piloting the element into the bore 36.

The opposed inner surfaces of the side walls of the channel are provided with corresponding upstanding grooves 42 which receive the legs 33 of the member 32 for guiding the latter relative to the element 40 and an actuator 43, preferably in the form of a lever which has a tubular end 44 pivotally connected to the side walls 20 by a pair of the screws 45 which extend through holes 46 in the walls for connection with threaded apertures 47 in the end 44 of the actuator.

The actuator is preferably elongate and provided with a reduced rear extremity 48 which is disposed between the side walls 20 of the channel for guidance. The upper portion of the actuator is preferably provided with longitudinally extending corrugations or ribs 49 to facilitate manipulation of the actuator. The actuator is also preferably provided with a pair of corresponding side walls 50 having bearing portions 51 which are adapted to engage the upper ends of the legs 33 of the member 32 as depicted in FIGURES 2 and 5 for camming the member downwardly so that its arcuate portion 31 will engage and cause the element 40 to slide in the post 26. A biasing or resilient means (not shown) within the reel serves to normally urge the element and actuator upwardly to a normal position for operation as shown in FIGURES 1 and 2. However, if desired, a spring may be operatively associated with the actuator or the element for maintaining the actuator in such position. It will be noted that the upper ends of the grooves 42 are preferably enlarged at 52 to provide clearance for the bearing portions 51 of the actuator.

As exemplified in FIGURE 3 of the drawing, the element 40 is adapted to pivot a lever 53 which in turn moves an actuating means 54 forwardly so that a cam 55 thereon will cooperate with a line control element 56 pivotally mounted on a rotatable drum 57 carried by a driven shaft 58 which is also moved by the lever 53 to shift the drum, element 56 and shaft forwardly as a unit. The element 56 serves to direct line onto a spool when the unit is rotated and as a brake to prevent the flow of line. Thus, operation of the element 56, constituting a component or part of the mechanism of the reel 3, to stop or retard outflow of the line is under control of the actuator of the assembly 3.

The assembly 3 is preferably assembled with the reel and handle by first attaching the channel to the reel attaching plate 25, inserting the member 32 into the groove of the channel with its arcuate portion 31 disposed in the opening 24, after which the member 11 is applied to the intermediate portion 5 of the handle structure so that the projections 10 and 16 can be caught in the socket formations of the rings 8 and 14 by manipulating the member 18. The actuator is then pivotally connected to the side walls of the channel by the screws 45.

Having thus described my invention, it is obvious that various modifications may be made in the same without departing from the spirit of the invention, and therefore, I do not wish to be understood as limiting myself to the exact form, construction, arrangement and combination of parts herein shown and described.

I claim:

1. An assembly for attaching a plate of a fishing reel to one side of a fish pole having a butt end and fastening means, said assembly comprising a channel having spaced side walls of appreciable height for receiving the pole therebetween and a bottom wall having means for engaging such a fastening means for securing the channel to the pole, a seat provided on said channel, means for securing the plate to said seat, and an elongate substantially horizontal actuator pivotally connected to said side walls at the opposite side of the pole for actuating an element adapted for movement through said plate, said pivotal connection being longitudinally spaced from said butt end with said actuator extending forwardly away from said butt end.

2. A fishing reel having a frame, a tubular post projecting from the frame and a plate portion disposed transverse to the post, an elongate channel member detachably connected to said portion and having a bottom wall for disposition at the underside of a pole having a butt end and side walls for straddling the pole, said member being provided with an opening and means adapted for connection with fastening means on a fish pole, slidable means completely concealed by and extending through said post into said opening, and manually engageable means pivotally carried by said side walls for disposition above a pole for actuating said slidable means, said manually engagable means extending forwardly from said pivotal connection away from said butt end.

3. In combination: a fish pole provided with longitudinally spaced fastening means, a fishing reel having a tubular post and an elongate portion integral with said post, a channel partially embracing said pole and provided with longitudinally spaced means engaging said fastening means for holding the channel in relation to said pole, said channel being provided with an opening, an external seat and internal guide means, means securing said elongate portion to said seat, means slidable and completely concealed in said post and extending into said opening, means disposed entirely within the confines of said channel lineally movable in said guide means and partially embracing said pole for engaging said slidable means, and means engaging said movable means for actuating the latter to effect sliding of said slidable means in a direction substantially transverse to the longitudinal axis of said pole.

4. The combination defined in claim 3, in which the movable means includes a pair of legs, and said means engaging said movable means is in the form of a substantially horizontal lever pivotally attached to said channel at a location above the pole for applying pressure to said legs.

5. An assembly for attaching a fishing reel to a pole provided with fastening means, said assembly comprising a channel having spaced side walls for partially embracing the pole and means for connection with such fastening means for attaching the channel to the pole, said assembly being provided with an opening, an external seat for connection with an attaching portion of a reel and internal guide means in the side walls of said channel, means lineally movable disposed in said guide means for movement entirely within the confines of said channel, and a manually engageable actuator carried by said side walls engaging said movable means for moving the same to actuate means accessible via said opening.

6. The assembly defined in claim 5, in which the actuator is in the form of a substantially horizontal lever pivotally connected to upper marginal edge portions of said side walls for applying manual pressure to said movable means at a location forwardly of the pivotal connection.

7. In combination: a fish pole provided with fasteners and a butt end, a channel partially embracing said pole and provided with means engaging said fasteners for fastening the channel to the pole, said channel being provided with a seat, a reel supported on said seat for disposition at one side of said pole and provided with reciprocable means extending transverse to the pole's longitudinal axis, said reel also being provided with a spool, a rotatable drum having a movable element thereon for directing a line onto the spool, actuating means interposed between said reciprocable means and said movable element, and elongate manually operable means pivotally mounted adjacent an opposite side of said pole for operating said reciprocable means to cause the latter to actuate said operating means to effect movement of said element, said manually operable means having a free extremity extending in a direction away from said butt end.

8. In combination: a handle for supporting a fishing rod and having a butt end, a post extending angularly with respect to the longitudinal axis of said handle and provided with a reel having a housing containing a reel mechanism, said mechanism including a spool and a rotatable drum carrying a movable component for directing a line onto the spool, elongate means slidably mounted and concealed within the confines of said post, actuating means interposed between said component and said elongate means, said elongate means having a part disposed in said housing for operating said component through said actuating means and an opposite concealed part extending in relation to said handle, and lever means horizontally associated with said handle and overlying the same including said elongate means whereby digital pressure can be applied thereto to actuate said elongate means, said lever means having a free extremity extending forwardly away from said butt end.

9. In combination: a handle for supporting a fishing rod and having a butt end, elongate actuating means mounted in overlying horizontal relation to and carried by a top side of said handle and having a free extremity extending away from said butt end for manual operation, a post extending downwardly from the underside of the handle directly below said actuating means and provided with a housing containing a reel mechanism, said mechanism including a spool and a movable component, and means concealed and mounted for movement substantially longitudinally of said post and having a portion disposed in said housing for operating said component independently of said spool and a lineally movable part extending upwardly in relation to said handle for operation by said actuating means solely by digital pressure.

References Cited by the Examiner

UNITED STATES PATENTS

| | | |
|---|---|---|
| 485,208 | 11/1892 | Mount. |
| 2,143,289 | 1/1939 | Toolan _____ 43—22 |
| 2,614,767 | 10/1952 | Dean _____ 242—84.2 |
| 2,736,979 | 11/1956 | Le Gal _____ 43—20 |
| 2,814,147 | 11/1957 | Henshaw _____ 43—22 |
| 2,882,637 | 4/1959 | Tuttle _____ 43—20 |

FOREIGN PATENTS

| | | |
|---|---|---|
| 1,207,001 | 8/1959 | France. |
| 407,695 | 8/1937 | Great Britain. |

OTHER REFERENCES

Popular Mechanics: June 1961, vol. 115, No. 6, p. 77 43–20.

ABRAHAM G. STONE, *Primary Examiner.*